United States Patent [19]
Fong et al.

[11] Patent Number: 6,069,885
[45] Date of Patent: May 30, 2000

[54] METHOD AND APPARATUS FOR PROVIDING HIGH SPEED SERVICES USING A WIRELESS COMMUNICATIONS SYSTEM

[75] Inventors: Thomas K. Fong, Aberdeen; Paul Shala Henry, Holmdel; Kin K. Leung, Edison; Xiaoxin Qiu, Middletown; Nemmara K. Shankaranarayanan, Roselle Park, all of N.J.

[73] Assignee: AT&T Corp, New York, N.Y.

[21] Appl. No.: 08/775,466

[22] Filed: Dec. 30, 1996

[51] Int. Cl.$^7$ .................................................. H04J 3/00
[52] U.S. Cl. ..................................... 370/336; 370/349
[58] Field of Search .................................... 370/328, 329, 370/330, 336, 337, 338, 349, 465, 468, 470, 346, 347, 348; 455/422, 446, 447, 449, 450, 452, 455, 464, 507, 509, 512, 513, 516

[56] References Cited

U.S. PATENT DOCUMENTS

| | | | |
|---|---|---|---|
| 4,949,395 | 8/1990 | Rydbeck | 370/435 |
| 5,117,423 | 5/1992 | Shepherd et al. | 370/280 |
| 5,185,739 | 2/1993 | Spear | 370/337 |
| 5,233,643 | 8/1993 | Naeini et al. | 455/456 |
| 5,247,699 | 9/1993 | Hartman | 455/33.1 |
| 5,355,367 | 10/1994 | Comroe et al. | 370/95.1 |
| 5,507,034 | 4/1996 | Bodin et al. | 455/452 |
| 5,581,548 | 12/1996 | Ugland et al. | 370/330 |
| 5,594,720 | 1/1997 | Papadopoulus et al. | 370/330 |
| 5,613,198 | 3/1997 | Ahmadi et al. | 370/337 |
| 5,649,292 | 7/1997 | Doner | 455/447 |
| 5,689,503 | 11/1997 | Wada et al. | 370/337 |

FOREIGN PATENT DOCUMENTS

| | | |
|---|---|---|
| 0150399A2 | 8/1985 | European Pat. Off. . |
| 0156335A2 | 10/1985 | European Pat. Off. . |
| 0684744A2 | 11/1995 | European Pat. Off. . |
| 0720405A2 | 7/1996 | European Pat. Off. . |
| 0731622A2 | 9/1996 | European Pat. Off. . |

OTHER PUBLICATIONS

Borgonovo, F. et al, "Capture Division Packet Access: A New Cellular Access Architecture for Future PCNs," *IEEE Communications Magazine*, Sep. 1996, pp. 154–162.

Acampora, A., "Wireless ATM: A Perspective on Issues and Prospects," *IEEE Personal Communications*, Aug. 1996, pp. 8–17.

Borgonovo, F. et al., "Capture–Division Packet Access for Wireless Personal Communications," *IEEE Journal on Selected Areas in Communications*, vol. 14, No. 4, May 1996, pp. 609–622.

*Primary Examiner*—Chi H. Pham
*Assistant Examiner*—Kwang B. Yao

[57] ABSTRACT

A method and apparatus for scheduling transmissions between a plurality of communications sites within a communications system. The communications system provides service to a service area which is divided into sectors. Each sector is assigned a time subframe in a pattern where adjacent sectors use different subframes. Communications sites within each sector communicate packets of information in at least one time subframe according to a schedule to minimize interference from other communications sites.

30 Claims, 9 Drawing Sheets

K=4

K=7

K=12

$K = i^2 + ij + j^2 = 19$

METHOD AND APPARATUS FOR PROVIDING HIGH SPEED SERVICES USING A WIRELESS COMMUNICATIONS SYSTEM

BACKGROUND OF THE INVENTION

The invention relates generally to wireless communications systems. More particularly, the invention relates to providing high-speed broadband services to a large number of users by utilizing a minimum amount of bandwidth in a wireless communications system.

The need for high-speed broadband packet services will grow tremendously in the coming years as work-at-home, telecommuting and Internet access become increasingly popular. Customers are expecting high quality, reliability and easy access to high-speed communications from homes and small businesses. Data rates of at least 10 mega-bits per second (Mbps) are needed to provide high speed services for: a) accessing the World Wide Web (WWW) for information and entertainment, b) providing data rates comparable to local-area networks (LAN) for telecommuters to access their computer equipment and data at the office, and c) multimedia services such as voice, image and video.

Traditional wireless communications systems have a problem delivering high-speed services because of the amount of bandwidth these services require. Bandwidth is a key limiting factor in determining the amount of information a system can transmit to a user at any one time. In terms of wireless networks, bandwidth refers to the difference between the two limiting frequencies of a band expressed in Hertz (Hz).

The concept of bandwidth may be better understood using an analogy. If information carried by a network were water, and links between communication sites were pipes, the amount of water (i.e., information) a network could transmit from one site to another site would be limited by the speed of the water and the diameter of the pipes carrying the water. Ignoring speed for a moment, the larger the diameter of the pipe, the more water (i.e., information) can be transmitted from one site to another in a given time interval. Likewise, the more bandwidth a communications system has available to it, the more information it can carry.

Traditional wired communications systems using modems and a physical transmission medium such as twisted pair copper wire, cannot currently achieve the data rates necessary to deliver high-speed service due to bandwidth limitations (i.e., small pipes). In an attempt to solve this bandwidth problem, the local exchange companies (LEC) have been engaged in planning and deploying hybrid fiber/co-ax (HFC) and switched digital video (SDV) networks. These wired-network approaches to providing high-speed access, however, require a substantial market penetration to keep the per-subscriber costs at an acceptable level due to the high costs involved.

Similarly, traditional wireless systems such as narrowband cellular and Personal Communications Services (PCS) are bandwidth limited as well. As an alternative, wireless solutions such as Multichannel Multipoint Distribution Service (MMDS) and Local Multichannel Distribution Service (LMDS) have become attractive for low take-rate scenarios, e.g., a market penetration of a few percent. The benefits of wireless systems for delivering high-speed services is that they can be deployed rapidly without installation of local wired distribution networks. The problem with MMDS and LMDS, however, is that these solutions presently offer limited uplink channel capacity Moreover, these solutions may not be capable of supporting a large number of users due to limited frequency reuse.

One solution for solving the bandwidth limitation problem for wireless systems is to maximize the available bandwidth through frequency reuse. Frequency reuse refers to reusing a common frequency band in different cells within the system. The concept of frequency reuse will be discussed in more detail with reference to FIGS. 1 and 2.

FIG. 1 is a diagram of a typical wireless communication system. A typical wireless communications system includes a plurality of communications sites, such as mobile telephone switching office (MTSO), base stations, terminal stations, or any other site equipped with a radio transmitter and/or receiver.

FIG. 1 shows a base station 20 in communication with terminal stations 22. Base station 20 is usually connected to a fixed network, such as the PSTN or the Internet. Base station 20 could also be connected to other base stations, or connected to a MTSO in the case of mobile systems. Terminal stations 22 can be either fixed or mobile.

Base station 20 communicates information to terminal stations 22 using radio signals transmitted over a range of carrier frequencies. Frequencies represent a finite natural resource, and are in extremely high demand. Moreover, frequencies are heavily regulated by both Federal and State governments. Consequently, each cellular system has access to a very limited number of frequencies. Accordingly, wireless systems attempt to reuse frequencies in as many cells within the system as possible.

To accomplish this, a cellular system uses a frequency reuse pattern. A major factor in designing a frequency reuse pattern is the attempt to maximize system capacity while maintaining an acceptable signal-to-interference ratio (SIR). SIR refers to the ratio of the level of the received desired signal to the level of the received undesired signal. Co-channel interference is interference due to the common use of the same frequency band by two different cells.

To determine frequency reuse, a cellular system takes the total frequency spectrum allotted to the system and divides it into K frequency reuse patterns. FIGS. 2(A) through 2(D) illustrates examples of frequency reuse patterns of K=4, 7, 12 and 19.

As shown in FIGS. 2(A) through 2(D), a cellular communications system has a number of communications sites located throughout a geographic coverage area serviced by the system. This geographic area is organized into cells and/or sectors, with each cell typically containing a plurality of communications sites such as a base station and terminal stations. A cell is represented in FIGS. 2(A) through 2(D) as a hexagon. FIG. 2(A) shows a frequency reuse pattern where K=4. Cells are grouped into sets of four, with each set employing frequency bands 1 through 4. This group of four cells is then repeated until the entire service area is covered. This same pattern is shown in FIGS. 2(B), 2(C) and 2(D) for sets of 7, 12 and 19 cells, respectively. Thus, in essence, the frequency reuse pattern represents how much geographic distance must be maintained between cells that use common frequency bands such that the co-channel interference for these cells is kept below a given threshold to ensure successful signal reception.

The most aggressive frequency reuse pattern for cellular systems is where K=1. Under this pattern, the same frequency band can be reused in every cell in the cellular communications system. In typical narrowband cellular systems, the total amount of frequency spectrum available to a system is divided by K. This determines how much frequency is available for a particular cell. For example, if a cellular system is allocated 20 megahertz (MHZ) of spectrum, and the frequency reuse pattern is K=4, then each cell has 5 MHZ worth of frequency on which to transmit radio signals. If K=1, the entire 20 MHZ worth of frequency spectrum is available to every cell to potentially transmit information.

To better understand the magnitude of benefit given by a frequency reuse pattern of K=1 discussed in the above example, the figures for a real communications system will be used. The frequency assignment for U.S. mobile cellular systems is 824–849 MHZ and 869–894 MHZ for a given service area. Since each service area is served by two cellular network operators, each cellular system must split the available bandwidth for the given service area. This amounts to a total of 25 MHZ of available bandwidth per system, with 12.5 MHZ being used for transmitting from a base station to a terminal station (referred to as the downlink), and 12.5 MHZ being used for transmitting from the terminal station to the base station (referred to as the uplink). A typical U.S. mobile cellular system has a frequency reuse pattern of K=21. Thus, each cell has roughly only 1.2 MHZ (25 MHZ divided by 21) of spectrum to transmit information. If a frequency reuse pattern of K=1 could be established, the entire 25 MHZ is available for transmitting information for each cell. This results in a twenty-one fold increase in available frequency spectrum for each cell. Using the analogy again, the diameter of the pipe is increased twenty-one times.

Several existing systems currently employ frequency reuse patterns of K=1. One example includes cellular systems employing code division multiple access (CDMA). CDMA systems spread the transmitted signal across a wide frequency band using a code. The same code is used to recover the transmitted signal by the CDMA receiver. CDMA systems reuse the same frequencies from cell to cell. CDMA systems, however, require a large amount of frequency spectrum. Moreover, the amount of spectrum required by CDMA systems to offer high-speed broadband services to a large number of users is commercially unrealistic.

Another example for aggressive frequency reuse includes cellular systems employing time division multiple access (TDMA), an example of which is discussed in U.S. Pat. No. 5,355,367. The system discussed in U.S. Pat. No. 5,355,367 is a TDMA system using the redundant transmission of information packets to ensure an adequate SIR for a call. The use of redundant packet transmissions, however, merely trades one inefficiency for another. Although a frequency band can be reused from cell to cell, redundant packet transmission means that a smaller portion of that frequency band is now available for use by each cell in the system since multiple packets are required to ensure the successful reception of a single packet.

In addition to the frequency reuse problem, traditional cellular systems are not engineered to allow a communications site to use the entire bandwidth available to the system ("total system bandwidth"), due to the low data rate expected by customers. Rather, traditional cellular systems employ various techniques in both the frequency domain and time domain to maximize the amount of users capable of being serviced by the system. These techniques are predicated on allocating smaller portions of the total system bandwidth to service individual communication sites. These smaller portions are incapable of providing sufficient bandwidth to offer high speed services.

An example of a technique employed in the frequency domain is Frequency Division Multiple Access (FDMA). FDMA splits the available bandwidth into smaller sections of bandwidth under the concept of providing less bandwidth for a greater number of users. Using the analogy, a single large pipe is separated into a number of smaller pipes, each of which is assigned to a sector or cell Unfortunately, the trade-off is that these smaller frequency bands are not large enough to support high-speed broadband packet services. Moreover, by definition, a communication site is not capable of using the total system bandwidth, but rather is limited to a discrete portion of the total system bandwidth.

An example of a technique employed in the time domain is TDMA. TDMA divides the available bandwidth into discrete sections of time, and allocates each section of time (typically referred to as a time slot) to each communication site. Each communication site transmits and receives information only at the site's specific time slot, thereby preventing collisions between communication sites. Using the analogy, each cell or sector has access to the entire pipe for a fixed amount of time. Traditional TDMA systems, however, are designed to handle circuit switching and, therefore, are static in nature. These systems allocate a specific time slot of a fixed duration for a specific communication site for the entire length of a call. As a result, a communication site cannot transmit more information than can be accommodated by its assigned time slot. In any event, these traditional TDMA systems are not designed to take advantage of new switching technology, such as packet switching.

Some systems employ a combination of FDMA and TDMA to improve the call capacity of the system. These FDMA/TDMA systems, however, merely combine the disadvantages of both. Moreover, FDMA/TDMA systems do not permit a user access to the total system bandwidth on a dynamic basis.

To solve this problem, some TDMA systems employ a concept called "dynamic resource allocation" to share the radio resource among communications sites efficiently. Dynamic resource allocation methods, however, require a central controller or complicated algorithms to dynamically determine available time slots and coordinate their use.

In light of the foregoing, it can be appreciated that a substantial need exists for a system employing a frequency reuse pattern of K=1 while allowing a communication site to utilize the total system bandwidth on a dynamic basis, thereby providing high-speed broadband packet services to a large number of users while minimizing the amount of required bandwidth.

SUMMARY OF THE INVENTION

This need and other needs are met using a method and apparatus for scheduling transmissions between a plurality of communications sites within a communications system. The communications system provides service to a service area which is divided into sectors. Each sector is assigned a time subframe in a pattern where adjacent sectors use different subframes. Communications sites within each sector communicate packets of information in at least one time subframe according to a schedule to minimize interference from other communications sites.

DETAILED DESCRIPTION

Figure 1:
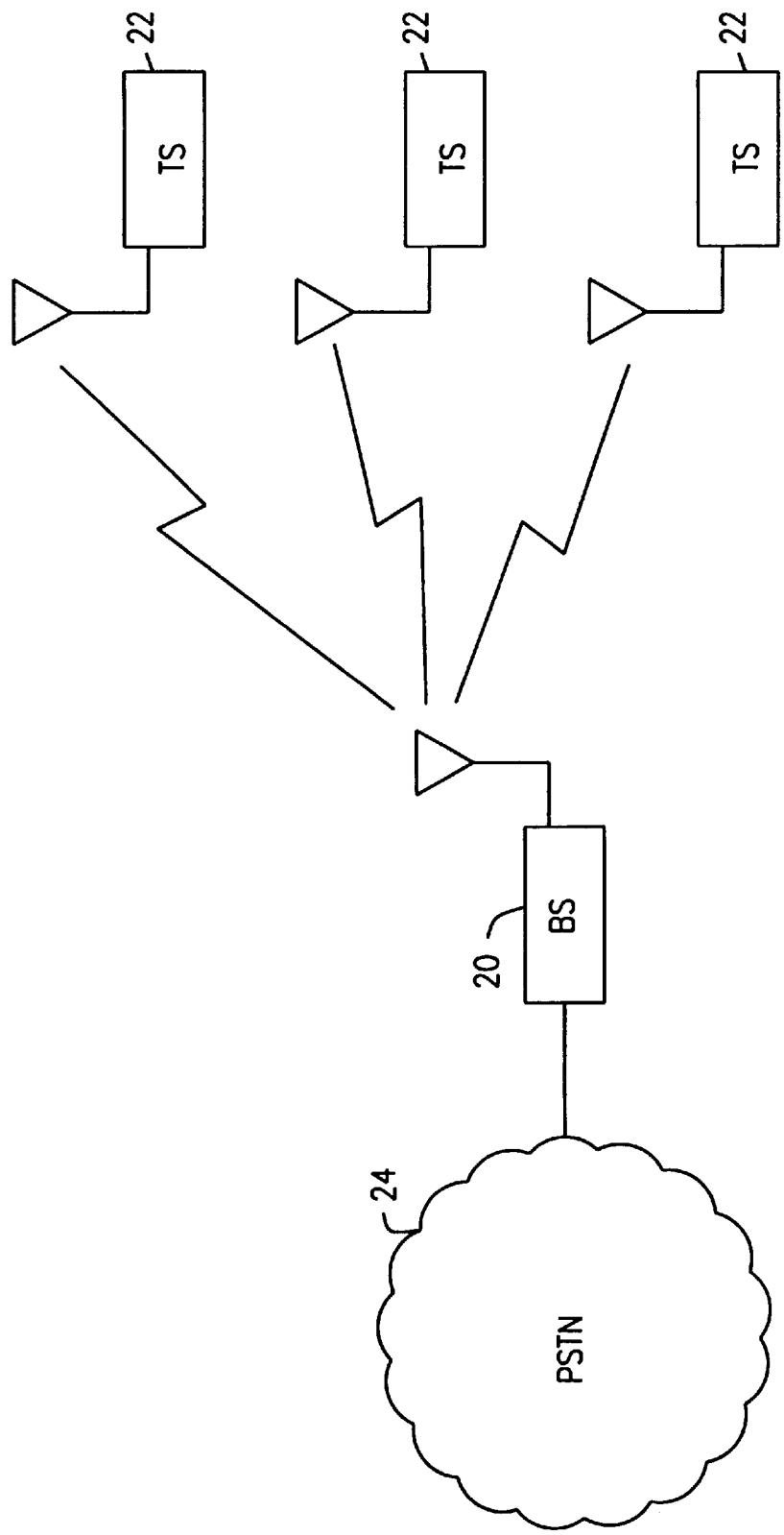
FIG. 1 shows a block diagram of a typical wireless system.
Figure 2A:
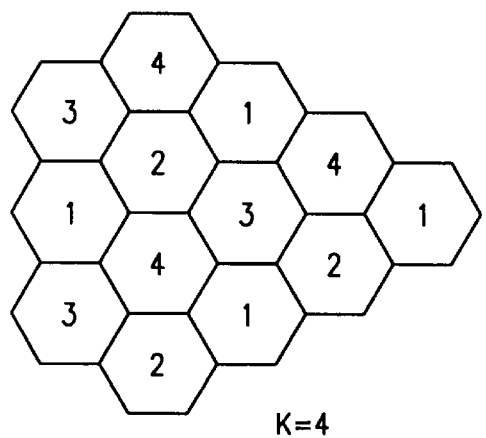
FIG. 2(A) shows a frequency reuse pattern when K=4.
Figure 2B:
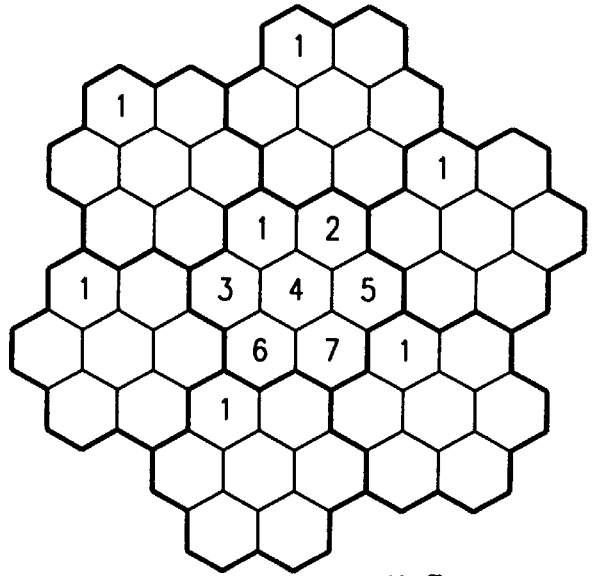
FIG. 2(B) shows a frequency reuse pattern when K=7.
Figure 2C:
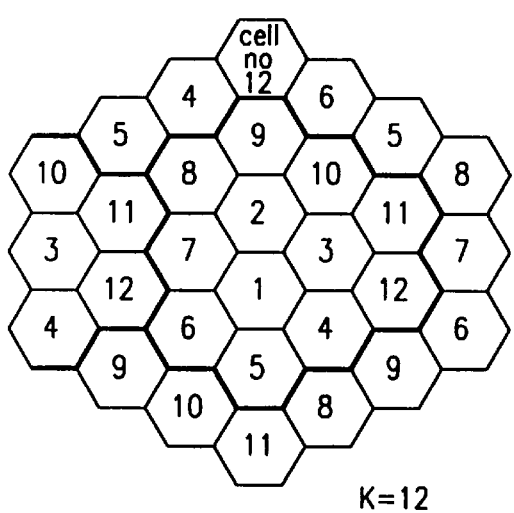
FIG. 2(C) shows a frequency reuse pattern when K=12.
Figure 2D:
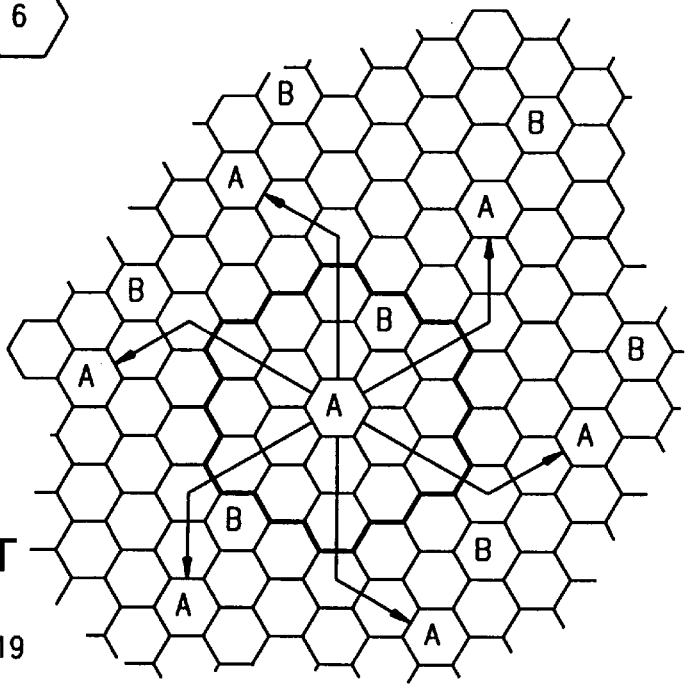
FIG. 2(D) shows a frequency reuse pattern when K=19.

In accordance with the present invention, a method and apparatus are discussed for providing a frequency reuse pattern of K=1 for a wireless communications system, while permitting each communication site within a sector to utilize the entire bandwidth available to the system on a dynamic basis. A cellular communications system is one example of a system which falls within the scope of the present invention.

Embodiments of the invention utilize a TDMA system design so that each cell and sector of the system can use a common frequency The embodiments illustrated herein identify the worst sources of interference for a downlink and uplink transmission and reception between communication sites within a cell. Through the use of directional antennas, cell sectorization, and a scheduling algorithm, these embodiments avoid the major sources of interference for a communications site within the system. This minimizes co-channel interference for satisfactory radio signal reception to the point where all available system bandwidth frequencies can be reused from cell to cell, and by each communication site on a dynamic basis.

In the context of this disclosure and the claims appended hereto, any references to scheduling can be implemented using a scheduler, and memory sufficient to store the scheduling algorithm. A scheduler includes a processing unit with sufficient processing speed. Examples of processing units include a microprocessor used in a general purpose computer or network server, and also a special dedicated hardware device. Further, any reference to communicating information includes transmitting and/or receiving information.

To illustrate various embodiments of the invention, assume a fixed (i.e., non-mobile) broadband packet-switched TDMA wireless network with user data rates of 10 Mbps, link lengths typically less than 10 kilometers and operating frequency in the range of 1 to 5 giga-hertz (GHz). To support a user data rate of 10 Mbps, the system utilizes a bandwidth of approximately 10 MHZ. It is worthy to note that although the various embodiments are discussed in accordance with a fixed network, a mobile network falls within the scope of the invention as well.

The TDMA system is organized as follows. Each cell is divided into multiple sectors, each of which is covered by a directional antenna co-located with a base station at the center of the cell. Terminal stations also use directional antennas pointed to their respective base station antennas. The beamwidth (angle) of each base station antenna should be just wide enough to cover the whole sector, while a terminal station antenna pointing to a designated base station antenna can have a smaller beamwidth to reduce interference. The ratios of front-to-back-lobe gain ("FTB ratio") for base station and terminal station antennas may be different, and are assumed to be finite. Time is slotted such that a packet of information can be transmitted in each slot. In addition, the downlink and uplink between terminal stations and base station can be provided by time-division duplex (TDD) using the same radio spectrum, or frequency-division duplex (FDD).

More specifically, each cell is divided into six sectors, each of which is served by a base station antenna with 60 degree beamwidth. Terminal station antennas can have an angle smaller than 60 degrees. Even for this advantageous structure, optimal scheduling of packet transmissions is complex, which is referred to by mathematicians as an NP-complete problem. Therefore, the various embodiments of the invention use a heuristic approach to identify and avoid the major sources of interference.

Figure 3:
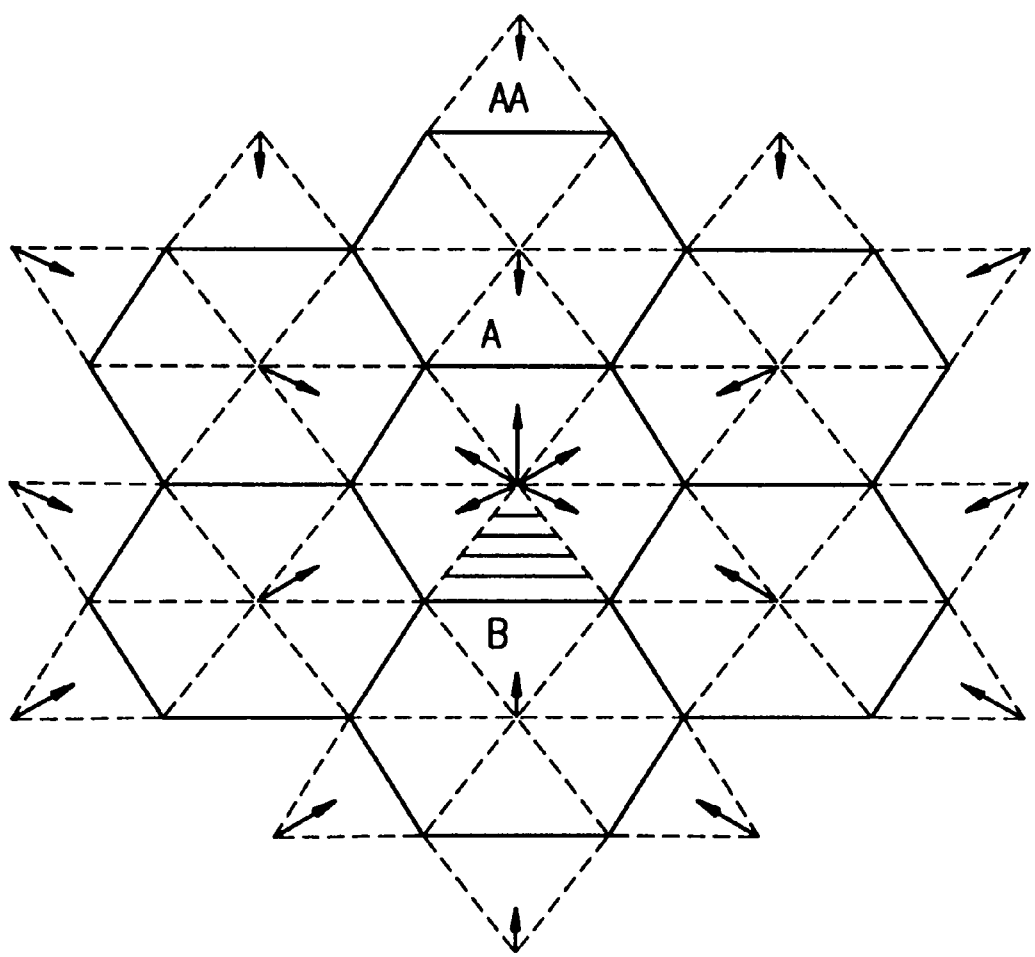
FIG. 3 is a cellular map with arrows indicating the major sources of interference for a downlink transmission for a shaded sector within a cell.

FIG. 3 is a cellular map with arrows indicating the major sources of interference for a downlink transmission for a shaded sector within a cell. Using a path loss model, the major interference for the downlink in the shaded sector is found to come from sectors in the same cell and sectors in other cells. Specifically, as shown in FIG. 3, alignment sector (A) and opposite sector (B) are the major sources of inter-cell interference. Sector (A) is a major source of inter-cell interference because a terminal station antenna in the shaded sector while pointing to its base station antenna also sees the front lobe of the base station antenna for Sector (A). Similarly, Sector (B) is another major source of inter-cell interference because of its close distance from the shaded sector.

Figure 4:
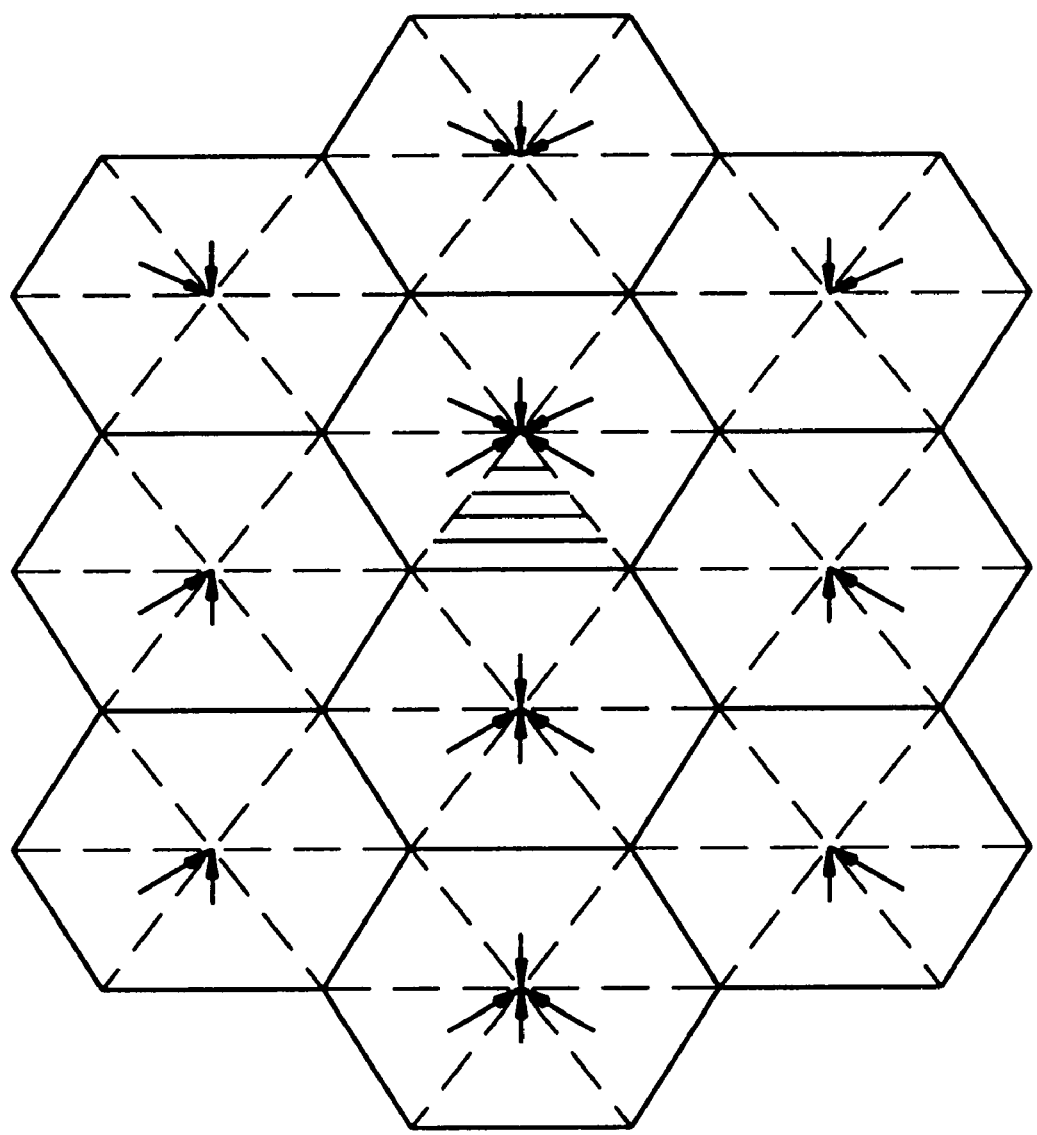
FIG. 4 is a cellular map with arrows indicating the major sources of interference for an uplink transmission for a shaded sector within a cell.

FIG. 4 is a cellular map with arrows indicating the worst sources of interference for an uplink transmission for a shaded sector within a cell. Similar to the downlink map shown in FIG. 3, the source of major interference for the uplink is received from sectors in the same cell and other cells. For both the downlink and uplink, the interference is compensated for in part using directional antennas at the base station. Directional antennas limit interference received from neighboring cells because of the FTB ratio of the directional antennas and the distance between inter-cell interference sources and the receiving base station antenna located in the shaded sector.

Figure 5:
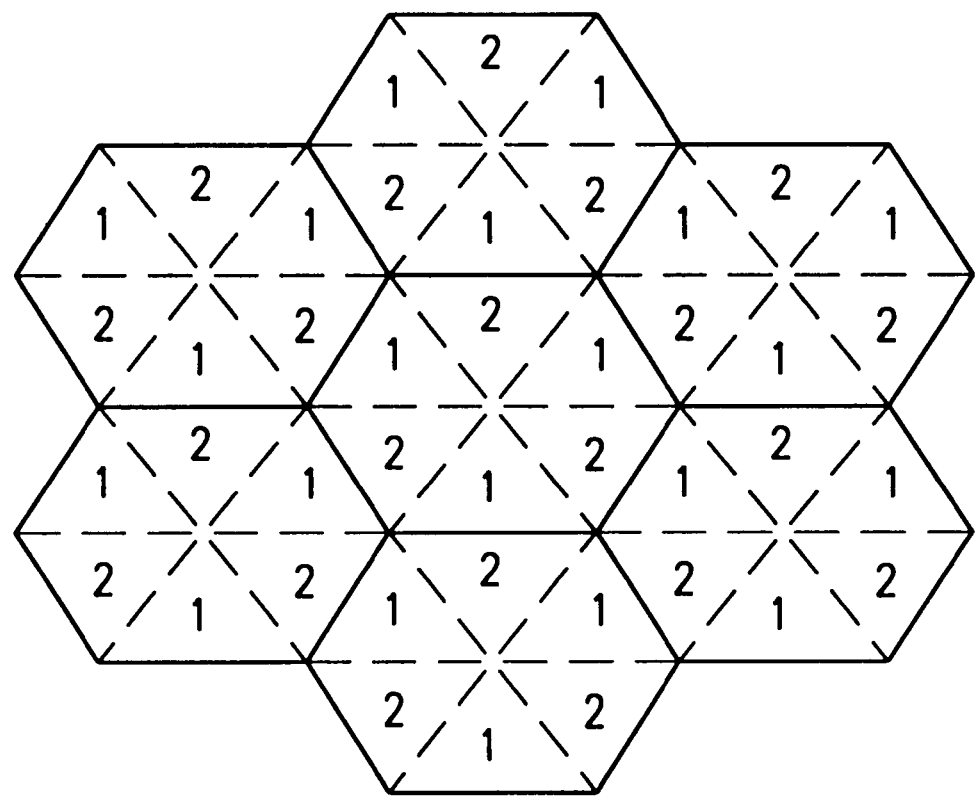
FIG. 5 is a cellular map with each cell divided into six sectors using two subframes in accordance with a first embodiment of the invention.
Figure 5:
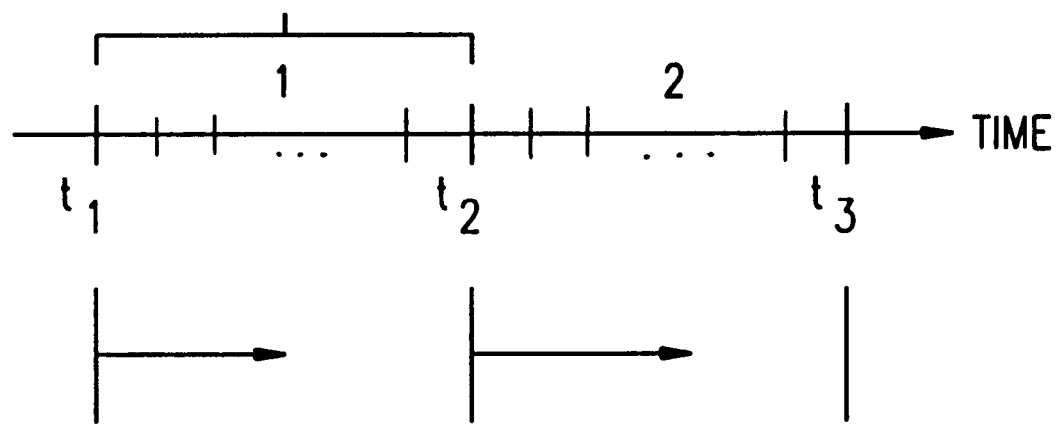

FIG. 5 is a cellular map with each cell divided into six sectors and two time subframes (for a downlink or uplink transmission) in accordance with a first embodiment of the invention. The total amount of bandwidth available to the system is separated into a fixed number of time slots for a downlink or uplink. The time subframes shown in FIG. 5 are used to illustrate either the uplink or downlink, but not both simultaneously. The time slots used for a downlink or uplink are grouped into subframes. Consecutive subframes are labeled alternately by 1 and 2. Sectors are also labeled by 1 and 2 such that no adjacent sectors share the same label. Sectors with label i can schedule packet transmission in time slots of subframe i. As a result, each sector can transmit on a 50% duty cycle, consuming at most half of the total bandwidth.

The term adjacent sectors as used herein means a sector which shares a common boundary with another sector, with the boundaries being defined in the various embodiments of the invention as three lines comprising one sector of a hexagon shaped cell. A point which is necessarily formed from the joining of any two of the three boundary lines is not considered a boundary for any of the various embodiments of the invention described herein. Similarly, although a cell is typically represented as a hexagon to facilitate the theoretical construction of a cell pattern, it can be appreciated that the actual implementation of a cellular system creates boundaries that do not necessarily follow precisely the theoretical pattern. Consequently, any reference to a common boundary refers to the boundaries formed using the theoretical pattern, not the actual implementation. The above notwithstanding, any boundary line contemplated and used in a theoretical pattern falls within the meaning of the term boundary as used herein.

One method for improving system performance for the time-slot assignment scheme discussed with reference to FIG. 5 is for a sector to borrow time slots from other subframes. This approach does not increase the overall system capacity for uniform traffic load, but it does enable efficient bandwidth sharing, especially for transient surges of traffic load. Borrowing time slots from other subframes used by neighboring sectors, however, requires a central controller or information exchange and coordination among base stations which significantly increases the cost and complexity of the system.

A better method for improving system performance for this assignment scheme is by allowing the use of slots in a subframe not originally assigned to a given sector. A left-right protocol is applied to minimize concurrent transmissions, thereby reducing interference.

Figure 6:
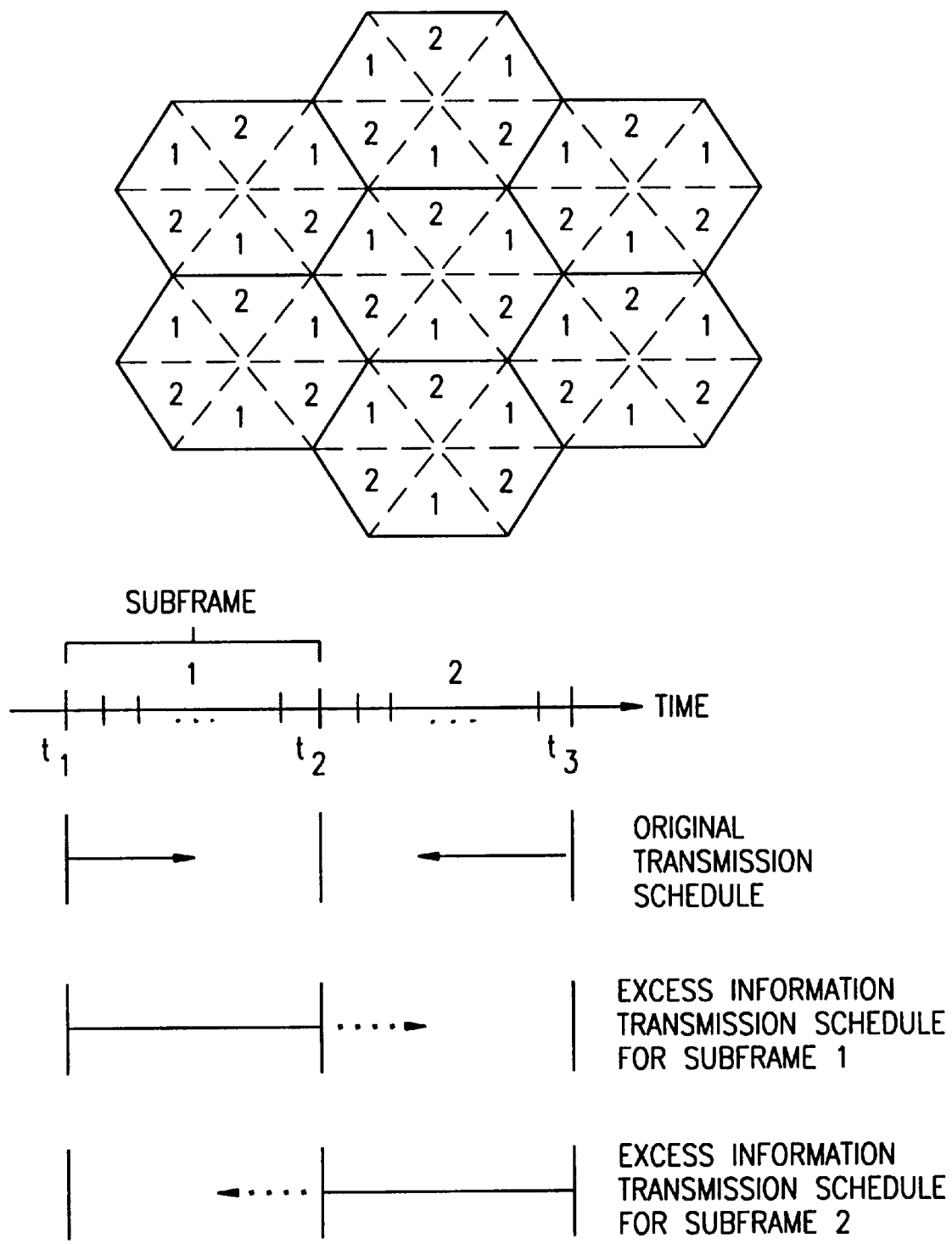
FIG. 6 is a diagram illustrating a left-right protocol in accordance with a second embodiment of the invention.

FIG. 6 is a diagram illustrating a left-right protocol in accordance with a second embodiment of the invention. A scheduler schedules when a communications site is to transmit information in a subframe to avoid major sources of interference from other communications sites. The scheduler accomplishes this using the left-right protocol. According to the left-right protocol, the scheduler creates two transmission schedules. The first transmission schedule is referred to as an original transmission schedule. The second transmission schedule is referred to as an excess transmission schedule.

According to the original transmission schedule, communications sites within label-1 sectors are scheduled to transmit packets in time slots starting from the left-hand side of subframe 1, or rather from t1 to t2. Communications sites within label-2 sectors, however, are scheduled to transmit in time slots starting from the right-hand side of subframe 2, or rather from t3 to t2. Thus, it can be appreciated that the left-right protocol alternates from which side a communications site is to transmit information in its assigned subframe.

It is worthy to note that the terms left side and right side as used herein correspond to start times and end times for a time subframe. The terms left side and right side are therefore used herein to denote temporal references not spatial references.

If the information for label-1 sectors are in excess of the amount of information capable of being transmitted in subframe 1, the left-right protocol creates an excess information schedule. The left-right protocol dynamically schedules the excess information from subframe 1 for transmission in subframe 2 from the left hand side of subframe 2, that is from t2 to t3. The excess information for subframe 2 is scheduled for transmission in subframe 1 from the right hand side of subframe 1, that is from t2 to t1. Since the left-right protocol schedules the transmission of excess information in opposite directions from the original transmission schedule for a subframe, the chances for collisions are minimized.

As illustrated above, the term "excess information" is used to describe information generated from a communication site within a sector which is in excess of the amount of information that can be transmitted in the sector's originally assigned time subframe. The term excess information does not refer to information which is unnecessary or superfluous.

Depending on traffic load, the left-right protocol yields as many as 3 to 6 concurrent packet transmissions in each time slot for each cell. Ideally, all sectors in a cell can transmit simultaneously, thereby yielding a sector reuse factor of one in every sector of every cell. Of course, if concurrent packet transmissions result in unsuccessful reception, the system merely retransmits the information using any conventional retransmission scheme.

By scheduling excess information from one subframe to another subframe within the same cell, a communication site within a sector can dynamically access additional bandwidth upon demand. Since this embodiment of the invention uses packet switching rather than circuit switching, this embodiment does not maintain a fixed correspondence between time slots within a subframe and communications sites. Rather, this embodiment of the invention dynamically assigns time slots within a subframe according to the amount of information to be transmitted by the communications sites.

The left-right protocol takes advantage of the fact that every communication site located throughout the cell is unlikely to be operating at full capacity at the same time. A more likely scenario is that, for example, one terminal station is going to be accessing the Internet to engage in video-conferencing or to watch the latest news report, while another is simply reading text-based e-mail. Thus, since terminal stations will vary in their bandwidth need at any given moment, the left-right protocol implements a method which takes advantage of subframes for sectors with terminal stations that are less active, utilizing a scheme which minimizes the chances of collisions between sectors. For example, if a base station has 10 time slots worth of information to transmit to a terminal station, the system dynamically allocates 10 time slots to accommodate the transmission. Similarly, if a base station only has 2 time slots worth of information, only 2 time slots are allocated by the system. Consequently, if a communication site or plurality of communication sites within that sector are engaging in bandwidth intensive activities to the point where all time slots within an initial sector's subframe are used, the system can use another sector's subframe to transmit the excess information. The system will select another subframe originally scheduled to fill its subframe from the opposite side of the initial subframe. Thus, assuming that the full capacity of the overflow subframe is not being utilized by its corresponding sector, the risk of collisions due to interference is minimized. In the event of collisions, the system merely retransmits the information using any conventional retransmission scheme.

It is important to note that although the left-right protocol was illustrated herein using a cell with six sectors and two subframes, it can be appreciated that any combination of sectors and subframes fall within the scope of the invention.

Figure 7:
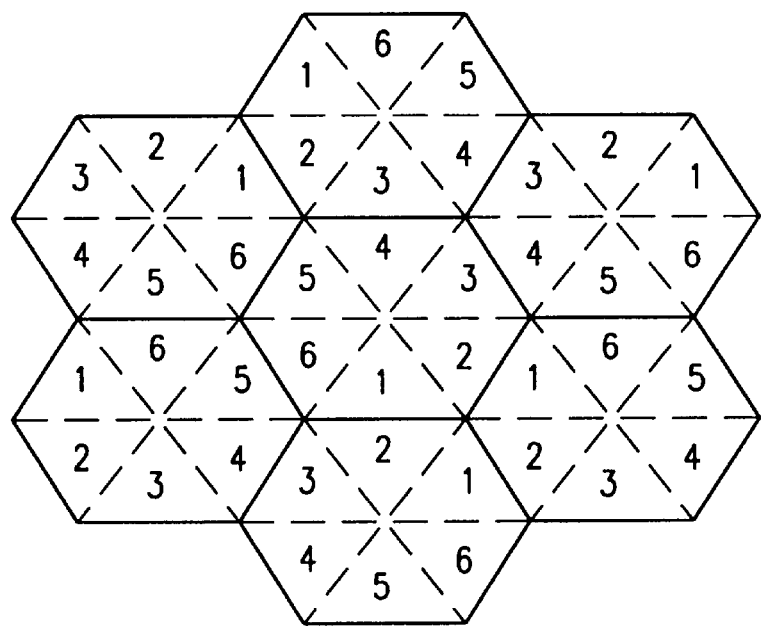
FIG. 7 is a cellular map with each cell divided into six sectors using six subframes in accordance with a third embodiment of the invention.
Figure 7:
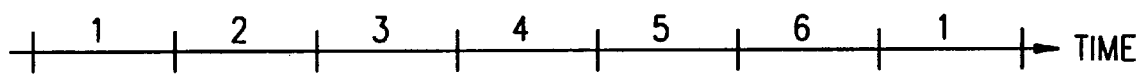

FIG. 7 is a cellular map with each cell divided into six sectors and six subframes in accordance with a third embodiment of the invention. The assignment scheme shown in FIG. 7 is similar to the assignment scheme described above with reference to FIG. 6. In FIG. 7, however, time slots are now grouped into subframes 1 through 6 and sectors are labeled 1 through 6 counterclockwise. The labeling patterns for adjacent cells differ by a 120 degree rotation. This rotation creates a 3 cell pattern which can be repeated across the entire system. It is important to note that adjacent sectors use different subframes. Under this embodiment, sector i can schedule packet transmission in subframe i for i=1 to 6.

This assignment scheme is very similar to the assignment scheme discussed in the first embodiment of the invention with reference to FIG. 5. Using the assignment scheme discussed with reference to FIG. 7, it can be appreciated that if all sectors have a traffic load of less than one-sixth of the total channel capacity, all packets are transmitted in different time subframes, thus causing no interference within the same cell. Similarly, because of the 120 degree rotation of labeling patterns among adjacent cells, adjacent sectors of adjacent cells also transmit in different time subframes, thus avoiding the major sources of interference from the adjacent cells. Consequently, the same frequency can be used in every sector of every cell.

This assignment scheme represents a very conservative approach since each sector can use only one-sixth of the total bandwidth. This approach may be appropriate for a radio environment where concurrent packet transmissions within the same cell can cause severe interference, or under low traffic conditions.

To enhance this conservative assignment scheme, a staggered resource assignment (SRA) protocol is introduced to permit a communication site within a cell to dynamically access bandwidth according to its current needs.

Figure 8:
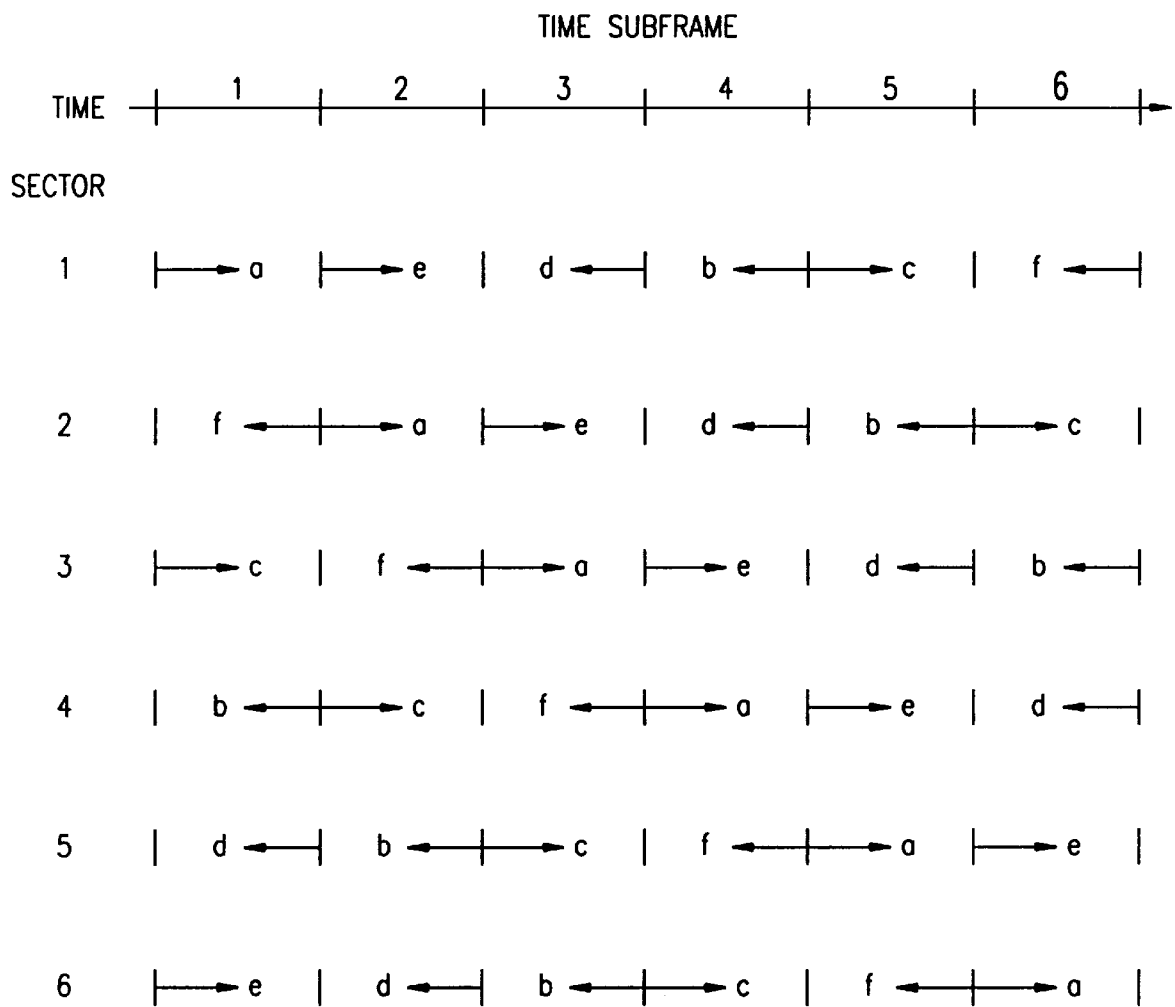
FIG. 8 is a diagram illustrating a staggered resource allocation protocol in accordance with a fourth embodiment of the invention.

FIG. 8 is a diagram illustrating a SRA protocol in accordance with a fourth embodiment of the invention. This SRA protocol is illustrated herein using the assignment scheme discussed with reference to FIG. 7.

The SRA protocol maximizes concurrent packet transmissions while minimizing packet collisions utilizing the spirit of the left-right protocol concept. As with the embodiment discussed with reference to FIG. 6, a scheduler creates an original transmission schedule and an excess transmission schedule. The excess transmission schedule is generated in accordance with the SRA protocol.

According to the original transmission schedule for this embodiment, communications sites within each sector are to schedule transmissions in each sector's originally assigned subframe from the left hand side.

In the excess information transmission schedule, excess information for a sector, referred to as an initial sector, is scheduled for transmission in subframes originally assigned to other sectors within the same cell. When subframes originally assigned to other sectors within the same cell are used to transmit excess information, these subframes are referred to as excess information subframes.

The scheduler selects excess information subframes according to a special order. The special order takes advantage of the directional antennas used within the system to minimize the amount of interference arising from concurrent packet transmissions. Concurrent packet transmissions refers to the use of a single time slot to transmit information from communications sites located in more than one sector.

The SRA protocol generates the special order by ordering the excess information subframes from those subframes originally assigned to sectors producing the least amount of interference for the communication site generating the excess information (MIN interference), to those subframes originally assigned to sectors producing the greatest amount of interference (MAX interference). Thus, if interference due to concurrent packet transmission in the same cell can be tolerated, a sector should use the first subframe of the opposite sector in the same cell after using all slots in the initial subframe, thereby making the best use of the base station directional antennas. Following that, time slots in the subframes for the sectors next to the opposite sector are used. To avoid interference due to imperfect antenna patterns of neighboring sectors, subframes for sectors adjacent to the initial sector are used as a last resort.

As shown in FIG. 8, for example, the special order for sector 1 is subframe 1 (a), subframe 4 (b), subframe 5 (c), subframe 3 (d), subframe 2 (e) and subframe 6 (f). Thus, the scheduler first schedules information for transmission by a communications site in a label-i sector in time slots of subframe 1 (denoted by a). If the sector has more traffic to send, it uses subframe 4, subframe 5, and so forth, until subframe 6.

As also shown in FIG. 8, the assignment order for the next sector is "staggered" by a right rotation by one subframe based on the order for the previous sector. Thus for sector 2, the sequential order for excess information schedule is subframes 5 (b), 6 (c), 4 (d), 3 (e) and 1 (f). Hence, this method is referred to as a "staggered" resource allocation method.

In addition to the excess information schedule indicating the order of excess information subframes to be used, the excess information schedule also indicates from which side transmission of excess information is to be scheduled in the excess information subframes. To accomplish this, the scheduler uses the spirit of the left-right protocol. More specifically, the scheduler alternates scheduling packet transmissions for each subframe from each subframes' left side or right side starting with the initial subframe and following with the other subframes according to the special order.

For example, assume subframe 1 is the initial subframe for sector 1. Information from sector 1 is scheduled to transmit information in subframe 1 (a) from the left hand side. Following the special order for the excess information schedule for sector 1, excess information is scheduled to be transmitted in subframe 4 (b) from the right hand side, followed by subframe 5 (c) from the left hand side, subframe 3 (d) from the right hand side, subframe 2 (e) from the left hand side, and finally subframe 6 (f) from the right hand side. The purpose for alternating sides is to further avoid collisions due to concurrent packet transmissions, thus reducing interference and enhancing system throughput. This is especially true in a case where there is uniform traffic load among sectors.

To better illustrate this concept, consider subframe 1 shown in FIG. 8. According to the SRA protocol, sector 4 uses subframe 1 as the second subframe (denoted by b) for transmission. To avoid concurrent transmission with sector 1, which starts from the left-hand side of subframe 1, sector 4 schedules packet transmission from the right-hand side. In many instances, sector 4 will not have enough packets to send in all slots of subframe 1, thus avoiding concurrent transmission with sector 1 as much as possible.

The fact that sector 3 needs to transmit in subframe 1 (c) in the SRA order implies that sector 1 will have a similar traffic load under uniform traffic conditions. Thus, it is likely that sector 1 will transmit in all slots in subframe 1. Consequently, the scheduling direction for sector 3 (from the left or the right-hand side) is unlikely to help avoid interference from transmission of sector 1.

By way of contrast, it is probable that sector 4 may not need to transmit in all slots in subframe 1 (which is the second subframe for sector 4). Under the same rationale applied for the opposite scheduling directions for sectors 1 and 4, since sector 4 schedules from the right-hand side, sector 3 should begin transmission from the left-hand side of subframe 1 to avoid possible interference between sectors 3 and 4. The same rationale applies to the scheduling directions of other sectors and other time subframes.

As for avoiding interference, it can be seen from FIG. 8 that if all sectors have a traffic load of less than one-sixth of the total channel capacity, all packets of different sectors are transmitted in different time subframes, thus causing no interference within the same cell. Of course, packets are transmitted simultaneously as the traffic load increases, thus increasing the level of interference. Nevertheless, the SRA protocol takes advantage of the characteristics of directional antennas to allow multiple concurrent packet transmissions while maximizing the SIR.

For a given radio environment and antenna characteristics, network operators can choose a parameter to control (limit) the number of concurrent transmissions by not scheduling transmission beyond the first few subframes. For example, if at most three packets can be sent simultaneously by various base station or terminal station antennas in the same cell, only time slots in subframes a, b and c would be used for transmission by each antenna.

In addition to managing intra-cell interference, the SRA protocol helps avoid interference from major sources in the neighboring cells. This is particularly true when traffic load is low to moderate. To better illustrate this, consider the downlink for Sector 1 in the middle cell of FIG. 7. Sector 2 in the bottom cell and Sector 3 in the upper cell are the major sources of interference. By examining the assignment order for sectors 1, 2 and 3 in accordance with the SRA protocol in FIG. 8, it can be appreciated that these sectors will not transmit simultaneously, thus not interfering with each other provided that they have a traffic load of less than one-third of total channel capacity, i.e., using only subframes a and b for transmission. Similarly, the uplink for sector 1 in the middle cell of FIG. 7 will not transmit simultaneously with sectors 2 and 5 of the bottom cell, which now become the major sources of interference. Due to the symmetry of the assignment order and cell layout, the SRA protocol, as well as the other embodiments of the invention, avoids the major interference for each sector in every cell.

The SRA protocol is variable depending on traffic load and a control parameter, with the number of concurrent packet transmissions in each cell ranging from 1 to 6. The control parameter can be chosen depending on the SIR and other requirements. As with previous embodiments of the invention, the SRA protocol can work with any number of sectors or cells.

Figure 9:
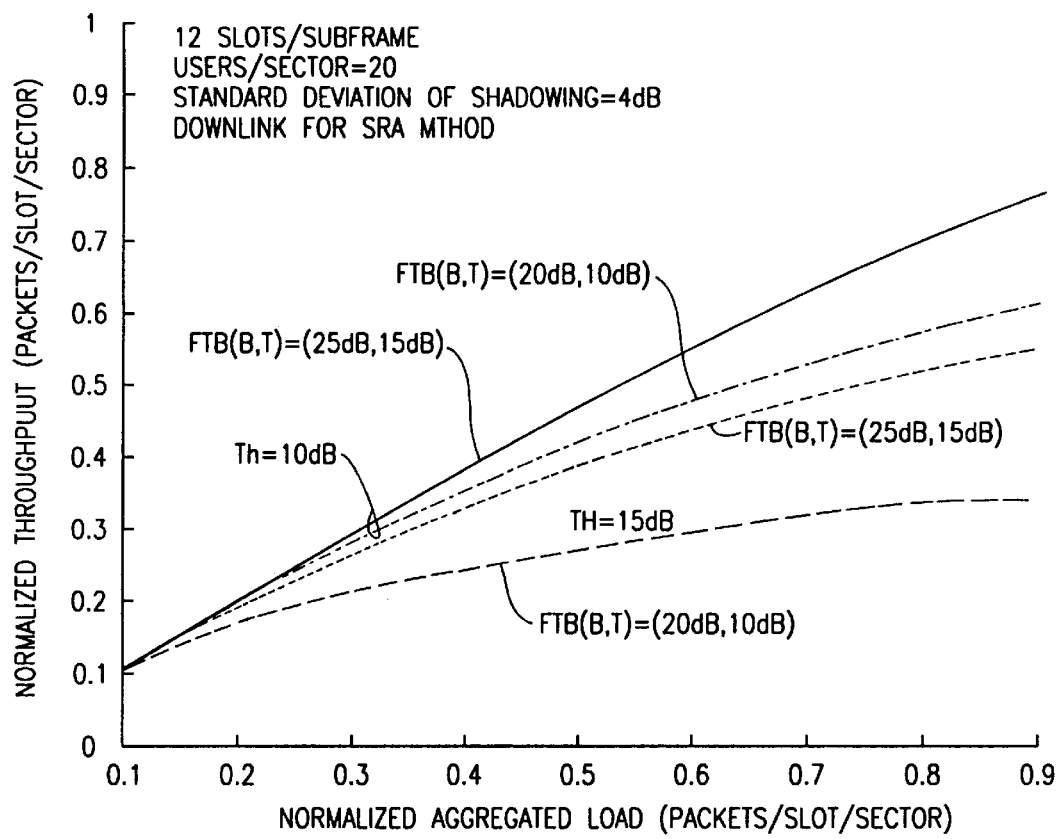
FIG. 9 is a normalized throughput v. normalized aggregated load graph in accordance with a fourth embodiment of the invention.

FIG. 9 is a normalized throughput v. normalized aggregated load graph in accordance with the fourth embodiment of the invention. An approximate analytic model has been developed to study the throughput characteristics of the SRA protocol. The model considers a fixed number of terminals (e.g., homes) randomly placed throughout each sector, finite FTB ratios for base station and terminal station antennas, radio path loss and lognormal shadowing effects.

FIG. 9 displays a sample of the numerical results for this analytic model. In this model, each subframe has 2 time slots, each sector has 20 terminals, the standard deviation of lognormal shadowing is 4 decibels (dB) and the path loss exponent is 4. FIG. 9 presents the downlink throughput of the SRA protocol for a set of typical FTB ratios for base station and terminal station antennas, denoted by B and T, respectively, in the figure. The throughput depends on the SIR detection threshold (Th). Using straightforward modulation and equalization schemes, e.g., Quadrature Phase Shift Keying (QPSK) and Decision Feedback Equalizers (DFE), the threshold typically lies somewhere between 10 to 15 dB. As shown in FIG. 9, the maximum throughput in each sector for the SRA protocol with these parameters ranges from 30% to 75%. That is, while re-using the same frequency to support high user data rates in every sector of every cell, this embodiment of the invention can achieve a throughput in excess of 30%. This throughput rate translates into a very large network capacity. This is because the SRA protocol is capable of selectively allowing concurrent packet transmission to increase throughput while avoiding major interference to yield satisfactory reception.

Although various embodiments are specifically illustrated and described herein, it will be appreciated that modifications and variations of the present invention are covered by the above teachings and within the purview of the appended claims without departing from the spirit and intended scope of the invention. For example, although a TDMA system was used to illustrate various embodiments of the invention, it can be appreciated that any time based system falls within the scope of the invention. Similarly, although various embodiments of the invention make reference to fixed terminal stations, it can be appreciated that mobile terminal stations fall within the scope of the invention. Another example includes the number of sectors and cells discussed in the various embodiments. It can be appreciated that any number of sectors or cells falls within the scope of the invention.

What is claimed is:

1. A method for scheduling packets for a communication system, the communications system having a service area divided into a first set of sectors with each sector assigned a time subframe, comprising:

determining whether a first time subframe is full;

scheduling a packet for said first time subframe if not full;

selecting a second time subframe from a predetermined list of time subframes if full;

scheduling said packet for said second subframe; and communicating said scheduled packet, wherein the first and second time subframes each have two sides, and wherein packets for said first time subframe are scheduled from a first side of the first time subframe, and packets for said second time subframe are scheduled from a second side of the second time subframe, wherein the two sides respectively correspond to start and end times of the first and second time subframes.

2. The method of claim 1, wherein said list comprises time subframes placed in a special order, and wherein said selecting comprises:

determining which time subframe of said list of time subframes is next in said special order; and selecting said next time subframe.

3. The method of claim 2, wherein said special order is formed by:

assigning each of said list of time subframes an interference value; and ranking said list of time subframes according to said assigned value.

4. The method of claim 3, wherein said ranking comprises ranking each of said first set of time subframes from a time subframe having a minimum interference value to a time subframe having a maximum interference value.

5. The method of claim 4, wherein the system includes a second set of sectors, with said second set of sectors being rotated with respect to the first set of sectors such that adjacent sectors use a different time subframe.

6. The method of claim 5, wherein said second set of sectors are rotated 120 degrees with respect to said first set of sectors.

7. The method of claim 6, wherein said special order changes according to where the sector assigned said first time subframe is located.

8. The method of claim 7, wherein said special order is staggered by one time subframe for adjacent sectors.

9. The method of claim 8, wherein said special order is determined according to a staggered resource allocation protocol.

10. The method of claim 1, wherein said first set of sectors has six sectors.

11. The method of claim 10, wherein said first set of sectors has six time subframes, with each sector having been assigned a different time subframe.

12. The method of claim 11, wherein said first time subframe is assigned to sector one, and said special order comprises time subframes four, five, three, two and six.

13. The method of claim 1, wherein the system has communication sites and a second set of sectors, each pair of sectors within a set of sectors having a first and second sector, and further wherein communications sites within said first sector transmit packets in said first time subframe, and communications sites within said second sector transmit packets in said second time subframe.

14. A machine-readable medium whose contents cause a computer system to schedule packets for a communication system, the communications system having a service area divided into a first set of sectors with each sector assigned a time subframe, by performing the steps of:
 determining whether a first time subframe is full;
 scheduling a packet for said first time subframe if not full;
 selecting a second time subframe from a predetermined list of time subframes if full;
 scheduling said packet for said second time subframe; and
 communicating said scheduled packet;
 wherein the first and second time subframes each have two sides, and wherein packets for said first time subframe are scheduled from a first side of the first time subframe, and packets for said second time subframe are scheduled from a second side of the second time subframe, wherein the two sides respectively correspond to start and end times of the first and second time subframes.

15. The machine-readable medium of claim 14, wherein said list comprises time subframes placed in a special order, and wherein said selecting comprises:
 determining which time subframe of said list of time subframes is next in said special order; and
 selecting said next time subframe.

16. The machine-readable medium of claim 15, wherein said special order is formed by:
 assigning each of said list of time subframes an interference value; and
 ranking said list of time subframes according to said assigned value.

17. The machine-readable medium of claim 16, wherein said ranking comprises ranking each of said first set of time subframes from a time subframe having a minimum interference value to a time subframe having a maximum interference value.

18. The machine-readable medium of claim 17, wherein the system includes a second set of sectors, with said second set of sectors being rotated with respect to the first set of sectors such that adjacent sectors use a different time subframe.

19. The machine-readable medium of claim 18, wherein said second set of sectors are rotated 120 degrees with respect to said first set of sectors.

20. The machine-readable medium of claim 19, wherein said special order changes according to where the sector assigned said first time subframe is located.

21. The machine-readable medium of claim 20, wherein said special order is staggered by one time subframe for adjacent sectors.

22. The machine-readable medium of claim 21, wherein said special order is determined according to a staggered resource allocation protocol.

23. The machine-readable medium of claim 14, wherein said first set of sectors has six sectors.

24. The machine-readable medium of claim 23, wherein said first set of sectors has six time subframes, with each sector having been assigned a different time subframe.

25. The machine-readable medium of claim 24, wherein said first time subframe is assigned to sector one, and said special order comprises time subframes four, five, three, two and six.

26. The machine-readable medium of claim 14, wherein the system has communication sites and a second set of sectors, each pair of sectors within a set of sectors having a first and second sector, and further wherein communications sites within said first sector transmit packets in said first time subframe, and communications sites within said second sector transmit packets in said second time subframe.

27. A communications system, the communication system having a service area divided into a first set of sectors, with each sector having a time subframe, each time subframe having a first side and a second side comprising:
 a transceiver;
 an antenna coupled to said transceiver; and
 a scheduler coupled to said transceiver, said scheduler scheduling a packet communicated by said transceiver over said antenna for a first time subframe from the first side of the first time subframe if said first time subframe is not full, and scheduling said packet for a predetermined second time subframe from the second side of the second time subframe if said first time subframe is full, wherein the two sides respectively correspond to start and end times of the first and second time subframes.

28. A method for scheduling packets for a communication system, the communications system having a service area divided into a first set of sectors with each sector assigned a time subframe, comprising:
 scheduling a packet for a first time subframe;
 determining whether said first time subframe is full;
 if the first time subframe is full:
  selecting a second time subframe from a predetermined list of time subframes;
  scheduling said packet for said second time subframe; and
  communicating said scheduled packet;
 wherein the first and second time subframes each have two sides, and wherein packets for said first time subframe are scheduled from a first side of the first time subframe, and packets for said second time subframe are scheduled from a second side of the second time subframe, wherein the two sides respectively correspond to start and end times of the first and second time subframes.

29. The method of claim 28, wherein the first side of the first time subframe corresponds to the start time of the first time subframe and the second side of the second side frame corresponds to the end time of the second time subframe.

30. The method of claim 28, wherein the first side of the first time subframe corresponds to the end time of the first time subframe and the second side of the second side frame corresponds to the start time of the second time subframe.

* * * * *